(12) United States Patent
Merriam

(10) Patent No.: US 6,401,051 B1
(45) Date of Patent: Jun. 4, 2002

(54) METHOD AND APPARATUS FOR LOCATING BURIED OBJECTS

(75) Inventor: Charles Merriam, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/295,435

(22) Filed: Apr. 20, 1999

(51) Int. Cl.[7] .......................... G01C 9/00; G01C 19/00; E21B 47/02
(52) U.S. Cl. .......................................... 702/150; 175/45
(58) Field of Search ................................ 702/150, 152, 702/153; 175/44, 45, 46, 52, 54, 56, 61, 62

(56) References Cited

U.S. PATENT DOCUMENTS

| | | | | |
|---|---|---|---|---|
| 4,495,496 A | * | 1/1985 | Miller, III ................... | 340/10.2 |
| 5,148,412 A | * | 9/1992 | Suggs ......................... | 367/131 |
| 5,438,771 A | * | 8/1995 | Sahm et al. ................. | 37/348 |
| 5,692,576 A | * | 12/1997 | Hesse et al. ................ | 175/45 |
| 5,904,210 A | * | 5/1999 | Stump et al. ............... | 175/45 |
| 5,974,881 A | * | 11/1999 | Donskoy et al. ........... | 73/579 |
| 6,035,951 A | * | 5/2000 | Mercer et al. .............. | 175/45 |
| 6,079,506 A | * | 6/2000 | Mercer ....................... | 175/45 |

* cited by examiner

*Primary Examiner*—Marc S. Hoff
*Assistant Examiner*—Mohamed Charioui
(74) *Attorney, Agent, or Firm*—Hickman Palermo Truong & Becker LLP; Bobby K. Truong; Cheryl A. Eichstaedt

(57) ABSTRACT

A method and apparatus are provided for locating buried objects prior to digging at a current location. According to the invention, a positioning device is taken to the location where digging is to take place. The positioning device receives positioning signals from one or more positioning stations, and based upon the positioning signals, determines the current location of the positioning device and hence the location of the dig site. Once the current location is determined, a registry database containing the locations of previously buried objects is accessed. The registry database is queried for all locations within a selected distance of the current location which have buried objects. If this query returns no records, then it is probably safe to dig at the current location. On the other hand, if the query returns one or more locations, then further digging at the current location should either be avoided or performed with great caution. To aid in the digging process, a map of the area around the current position may be provided showing the locations of the previously buried objects. Regardless of whether there are buried objects within close proximity to the current location, if the digger decides to bury a new object at the current location, the current location is passed to the registry database and stored therein. This serves to update the database to include the new object so that future queries of the registry database will reveal the presence of the newly buried object. The registry database is thus populated and grown.

16 Claims, 4 Drawing Sheets

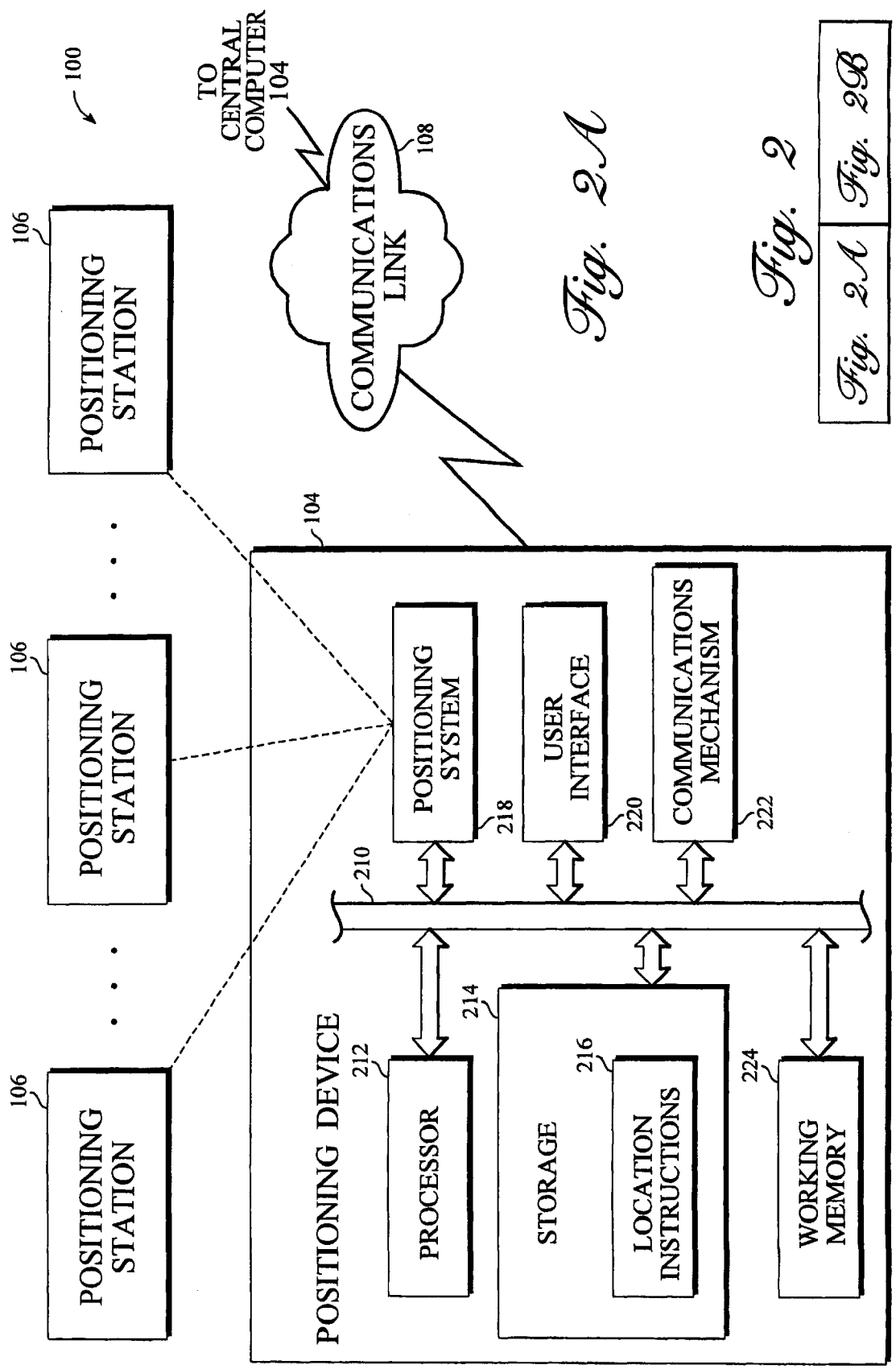

METHOD AND APPARATUS FOR LOCATING BURIED OBJECTS

BACKGROUND

This invention relates generally to computing systems and more particularly to a method and apparatus for locating buried objects such as telephone, coaxial, and fiber optic cables.

In several industries, and especially the communications industry, objects (such as telephone, coaxial, and fiber optic cables) are buried on a regular basis. to These objects are typically buried to keep them out of sight and to prevent damage to them from such sources as lawnmowers, pets, the elements, vandalism, etc. Ironically, the fact that these objects are buried subjects them to some degree of risk of damage. Specifically, whenever an activity requiring digging (such as laying new cables, gardening, repairing plumbing, etc.) is performed, there is a chance that the buried cables will be damaged. This is so because the digger cannot see and hence cannot avoid the cables. As a result, buried cables are damaged on a fairly regular basis, sometimes by the people who originally buried them.

Whenever a communications cable is damaged, it is a fairly serious matter.

For one thing, it may cause a service outage to a large number of homes and businesses, thereby inconveniencing a significant number of people. For another, it usually requires that an emergency response team be dispatched to repair the damage. Such teams are typically highly skilled and hence are usually quite expensive. As a result, repair of a damaged cable is a very resource intensive proposition, both in terms of money and in terms of time spent placating customers.

Because of the high cost of repairing damaged cables, there is great incentive to prevent the damage from occurring in the first place. One of the ways, and perhaps the most effective way, to prevent damage to buried cables is to locate them prior to digging. If the digger knows where the cables are, then he can either dig in another location or dig around the cables to prevent damage. With location of the cables being the premise, the issue then becomes the manner in which the cables are to be located.

Several rudimentary methods are currently used to locate cables prior to digging. The first involves the use of above-ground markers, such as small stakes and flags, to demarcate the presence of cables. With the locations of the cables clearly marked in this manner, it is a simple matter to dig around them, thereby preventing damage. This methodology has at least one major drawback, however, which is that it is easily derailed. If the markers are ever removed, for example by a strong storm or by a trespasser, the locations of the cables are lost. If the locations of the cables are lost, then there will be no way to locate the cables prior to any further digging. As a result, further digging will have to be performed at the risk of damaging the cables.

Another methodology that is used to locate buried cables involves the use of crude maps. According to this methodology, at the time that the cables are buried, a map is created detailing the locations at which the cables are buried. Once created, such a map may be used at a later time to determine the locations of the cables. While this methodology can be effective, it has a significant practical drawback. That drawback is that the locations of the cables are typically not stated in absolute terms. Rather, they are often stated in terms relative to certain landmarks. For example, the location of a cable may be stated as being within a certain distance of a fence or a tree. If such a landmark is ever removed, then the map becomes useless. If the map is ever rendered useless, then any further digging will again have to be performed at the risk of damage to the buried cables. As this discussion shows, the current methodologies for locating buried cables are far from satisfactory. As a result, a need exists for an improved methodology for locating buried cables and buried objects in general.

SUMMARY OF THE INVENTION

The present invention takes advantage of positioning technology to provide a more effective methodology for locating buried objects. According to the present invention, whenever digging is to be performed, a positioning device is first taken to the location where the digging is to take place. The positioning device receives positioning signals from one or more positioning stations, and based upon the positioning signals, determines the current location of the positioning device and hence the location of the dig site. This location is an absolute location which is not dependent upon any removable landmarks.

Once the current location is determined, a registry database containing the locations of previously buried objects is accessed. The registry database is queried for all locations within a selected distance of the current location having buried objects associated therewith. If this query returns no records, then it means that there are no buried objects within close proximity to the dig site, which in turn means that it is safe to dig at the current location. On the other hand, if the query returns one or more locations, then it means that there are buried objects near the dig site and that further digging at the current location should either be avoided or performed with great caution. To aid in the digging process, a map of the area around the current position may be provided showing the locations of the previously buried objects. This map will help the digger avoid the previously buried objects if he decides to proceed.

Regardless of whether there are buried objects within close proximity to the current location, if the digger decides to bury a new object at the current location, the current location is passed to the registry database and stored therein. This serves to update the database to include the new object so that future queries of the registry database will reveal the presence of the newly buried object. The registry database is thus populated and grown. By locating buried objects prior to digging in the manner described, the present invention prevents damage to buried objects such as telephone, coaxial, and fiber optic cables.

BRIEF DESCRIPTION OF THE DRAWINGS

FIGS. 2a and 2b are detailed block diagrams of the system of FIG. 1.

DETAILED DESCRIPTION OF THE PREFERRED EMBODIMENTS

Figure 1:
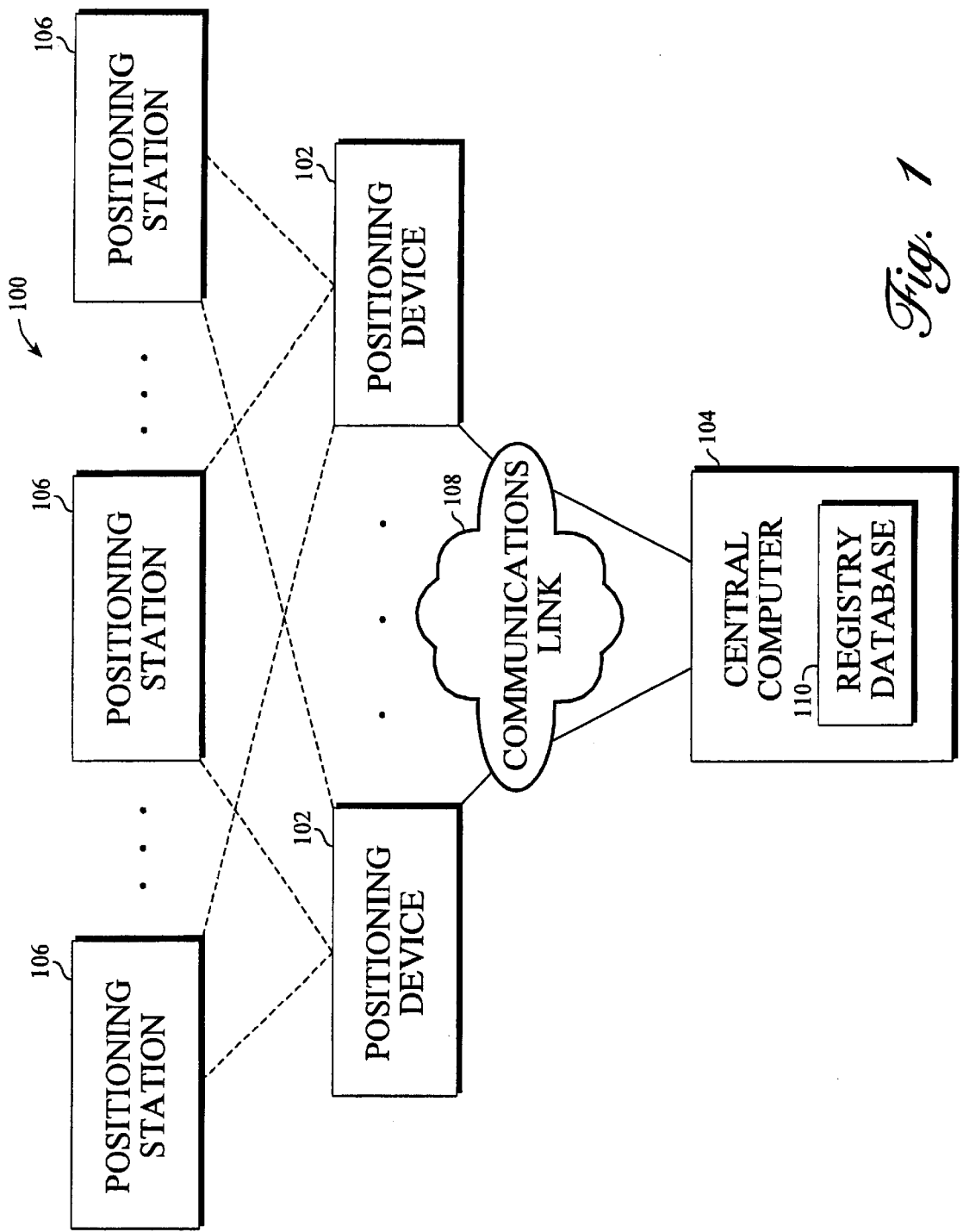
FIG. 1 is a block diagram of a system in which the present invention may be implemented.

With reference to FIG. 1, there is shown a system in which the present invention may be implemented, the system 100 comprising one or more positioning devices 102, a central computer 104, and one or more positioning stations 106. The positioning stations 106 may be either space-based (e.g. satellites) or terrestrial based (e.g. earth base stations). For purposes of the present invention, any mechanism that is capable of providing positioning signals which may be used to determine the location of an object can serve as a positioning station.

In system 100, the positioning device 102 is the component that is taken to a dig site. It is the responsibility of the positioning device 102 to determine its own current location, and hence the current location of the dig site. This determination is made based upon positioning signals provided to the positioning device 102 by the positioning stations 106. Once the current location is determined, the central computer 104 is consulted, via a communications link 108, to determine whether there are any buried objects at or near the current location. The central computer 104, which maintains a registry database 110 of locations at which objects have been previously buried, makes this determination by searching the database 110 for all locations within a certain distance of the current location. Thereafter, the central computer 104 provides to the positioning device 102, via the communications link 108, all of the locations retrieved from the database 110. Based upon the location information received from the central computer 104, the positioning device 102 provides to a user an indication as to whether there are buried objects within relative close proximity to the current location. This indication allows the user to determine whether he should or should not dig at the current location. Together, the various components of system 100 cooperate to carry out the buried object location methodology of the present invention.

In the system of FIG. 1, the computer 104 is shown as a centralized computer configured to service multiple positioning devices 102. This configuration is advantageous because it enables the database 110 to be stored only once, and because it ensures that all of the positioning devices 102 will be privy to the most updated and consistent information. While this configuration is advantageous, it should be noted that other configurations are also possible. For example, if so desired, the central computer 104 may be eliminated, and all of the functionality of the central computer 104 may be incorporated into each of the positioning devices 102. This and other modifications are within the scope of the present invention.

Figure 2B:
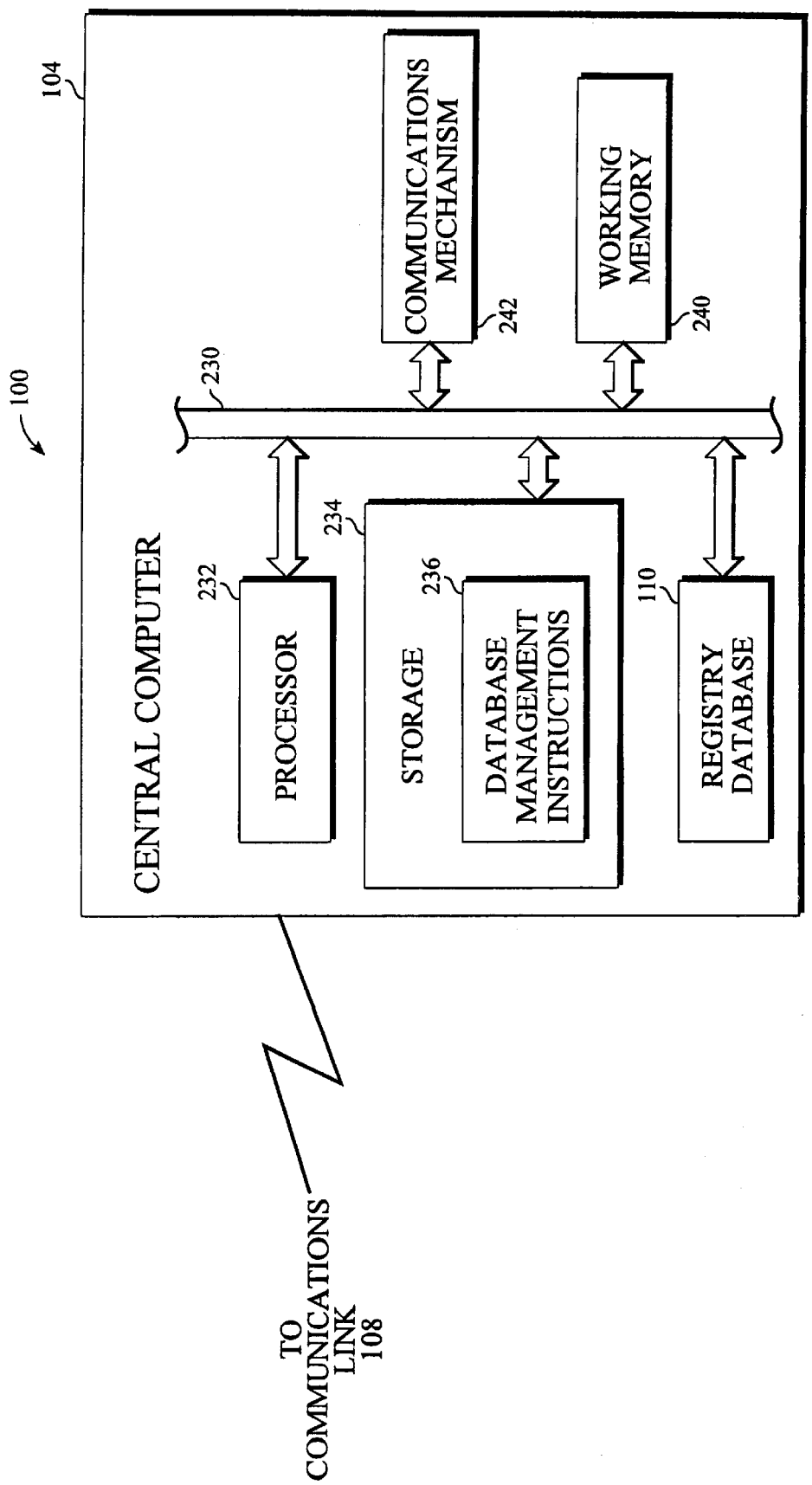

With reference to FIGS. 2a and 2b, the components of system 100 will now be described in greater detail. As shown in FIG. 2a, the positioning device 102 comprises a main bus 210 and a plurality of components coupled to the main bus 210, including a processor 212, a storage 214 (e.g. a hard drive), and a working memory 224. The storage 214 contains therein a set of location instructions 216 which are executed by the processor 212 to carry out the methodology of the present invention. The working memory 224 is used by the processor 212 as temporary storage to facilitate the execution of the location instructions 216 and the manipulation of data. In one embodiment, the functionality of the invention is derived from the processor 212 executing the program instructions 216; however, it should be noted that the invention is not so limited. If so desired, the functionality of the present invention may be achieved by way of hard-wired logic components. This and other modifications are within the scope of the invention.

In addition to the processor 212, storage 214, and working memory 224, the positioning device 102 further comprises a positioning system 218 coupled to the main bus 210. Positioning system 218 comprises an input mechanism (such as a receiving mechanism) for receiving positioning signals from the positioning stations 106, a determining mechanism for determining a current location based upon the positioning signals, and an output mechanism for providing the current location to the processor 212. For purposes of the present invention, the positioning system 218 is one that is capable of determining a current location accurate to within several feet. Positioning systems 218 having this degree of granularity are currently commercially available. The Differential Global Positioning System manufactured by Trimble Navigation, Inc. of Sunnyvale, Calif., is an example of such a system.

The positioning device 102 further comprises a user interface 220 and a communications mechanism 222, both of which are coupled to the main bus 210. The user interface 220 includes all of the components necessary for receiving input from and providing output to a user, including but not limited to a display, an audio system (e.g. sound card and speakers), a keyboard, a mouse, a trackball, a pen or stylus, a touch sensitive screen, and a microphone. The communications mechanism 222 comprises all of the components necessary for transferring information into and out of the positioning device 102. The form taken by the communications mechanism 222 will depend upon the type of communications link 108 that is desired between the positioning device 102 and the central computer 104. For example, if the desired communications link 108 is a telephone connection, then the communications mechanism 222 may be a modem. On the other hand, if the link 108 is a network connection, then mechanism 222 may be an ethernet card. As a further example, if the link 108 is a wireless connection, then communications mechanism 222 may be a transmitting/receiving mechanism. The communications mechanism 222 may take on these and other forms.

The central computer 104 (FIG. 2b) has a configuration similar to that of the positioning device 102. More specifically, like the positioning device 102, the central computer 104 comprises a main bus 230 and a plurality of components coupled to the main bus 230, including a processor 232, a storage 234 (e.g. a hard drive), and a working memory 240. The storage 234 contains therein a set of database management instructions 236, and a registry database 110. The database management instructions 236 are executed by the processor 232 to access and manipulate information stored in the registry database 110. Together, the processor 232 and the instructions 236 form a database management system (DBMS). This DBMS is capable of performing all of the operations necessary for managing the registry database 110, including performing data inserts, data updates, and data deletes. The DBMS is also capable of performing queries on the data stored in the database 110 to retrieve therefrom information that satisfy certain specified criteria. In performing these operations, the working memory 240 is used to facilitate instruction execution and data manipulation.

For purposes of the present invention, the registry database 110 has stored within it all of the locations at which objects have been previously buried. For example, if an object has been buried at location X, then location X should be stored within the registry database 110. Other information may also be stored along with the location, such as the object that was buried at the location, the geometry of the object, and the date on which the object was buried. For an object that spans several locations, the object may be registered in one of several ways. For example, the object may be registered as a series of point locations. As an alternative, the object may be registered as a starting location, an ending location, and a geometry. With the starting location, the ending location, and the geometry of the object specified, there is sufficient information to determine all of the locations at which the object is buried. Regardless of the method used to register an object, the registry database 110 acts as a central repository for recording the locations of all buried objects.

In the present invention, it is desirable for the DBMS to be able to perform a spatial query. That is, given a point in space (i.e. a current location), the DBMS is able to retrieve from the database 110 all points in space within a certain distance of the given point in space. This capability will enable the DBMS, given a current location, to find all of the locations stored in the database 110 that are within a certain distance of the current location. In practical terms, this will enable the DBMS to determine whether there are any buried objects within relatively close proximity to the current location. Database management software packages having the spatial query capability are commercially available. The Oracle8 Database manufactured by Oracle Corporation of Redwood Shores, Calif., with the Spatial Data Cartridge is one such software package. The Oracle8 Database, which is a relational database, is just one type of database that can be used to implement the invention. Other database types, including a hierarchical database, may also be used.

In addition to the processor 232, non-volatile storage 234, and working memory 240, the central computer 104 further comprises a communications mechanism 242 coupled to the main bus 230. Communications mechanism 242 comprises all of the components necessary for transferring information into and out of the central computer 104. As with the communications mechanism 222 in the positioning device 102, the form taken by the communications mechanism 242 will depend upon the type of communications link 108 that is desired between the positioning device 102 and the central computer 104. If the desired communications link 108 is a telephone connection, then the communications mechanism 242 may be a modem. If the link 108 is a network connection, then mechanism 242 may be an ethernet card. Further, if the link 108 is a wireless connection, then communications mechanism 242 may be a transmitting/receiving mechanism. The communications mechanism 242 may take on these and other forms.

The physical embodiment of the present invention has been fully disclosed. With reference to the flow diagram of FIG. 3, the methodology of the invention will now be described. According to the invention, before a user begins digging at any dig site, the user first transports (302) the positioning device 102 to the dig site. Then, the user invokes (304) the location function of the positioning device 102, which causes the processor 212 in the positioning device 102 to begin executing the location instructions 216 stored in storage 214. Under direction of the location instructions 216, processor 212 invokes the operation of the positioning system 218. In response, positioning system 218 receives positioning signals from the positioning stations 106, and based upon the positioning signals, determines (306) the current location of the positioning device 102. Since the positioning device 102 is at the dig site, this current location is also the location of the dig site. This location is an absolute location which is not dependent upon any removable landmark. Once the current location is determined, the positioning system 218 provides the current location to the processor 212.

Thereafter, the processor 212 establishes a communication link 108 with the central computer 104 using the communications mechanism 222. Once established, the link 108 is used by the processor 212 to submit (308) a query request to the central computer 104. This query request includes the current location of the positioning device 102.

In response, the processor 232 in the central computer 104, under direction of the database management instructions 236, receives the query request, and queries (310) the registry database 110 using the current location as one of the query conditions. Specifically, the processor 232 retrieves from the registry database 110 all of the locations within a certain distance of the current location. This certain distance may be specified by the processor 212 in the positioning device 102 as part of the query request, or it may be a predetermined parameter. The result of this query is a collection of all of the locations containing buried objects within relatively close proximity to the current location. These results are sent by the processor 232 to the positioning device 102 via the communications link 108.

The query results are received (312) by the processor 212 in the positioning device 102, and based upon the results, the processor 212 determines (314) whether there are any buried objects within relatively close proximity to the current location. More specifically, if the query results contain no locations, then it is determined that there are no buried objects near the current location. In this case, the processor 212 displays a message (316) to-the user via the user interface 220 indicating that the user may dig at the current location without disturbing previously buried objects.

On the other hand, if the query results include one or more locations, then it is determined that there are buried objects near the current location. In such a case, the processor 212 sends (318) to the user via the user interface 220 an indication that digging at the current location my disturb previously buried objects. This indication may take various forms, including that of a text message and/or a map of the area around the current location showing the locations of the buried objects. This map will help the user navigate around the buried objects, should he decide to proceed with the digging.

Regardless of whether there are buried objects near the current location, a user may ultimately decide to dig (320) in the current location to bury a new object. If the user does decide to bury a new object, the user provides to the positioning device 102 an indication of the user's intention to bury a new object. The processor 212 receives (322) this indication from the user via the user interface 220. In response, the processor 212 sends (324) an update request to the central computer 104 via the communications link 108. The update request instructs the central computer 104 to add the new object to the registry database 110. The update request may include just the current location of the object, or it may include the starting location, the ending location, and the geometry of the object. Once the new object is registered with the database 110, the next time the database 110 is queried, the current location will be treated as a location at which an object has been buried. In response to the update request, the processor 232 in the central computer 104, still under the direction of the database management instructions 236, stores (326) the information relating to the new object into the registry database 110. The database 110 is thus updated to reflect the newly buried object.

Figure 3:
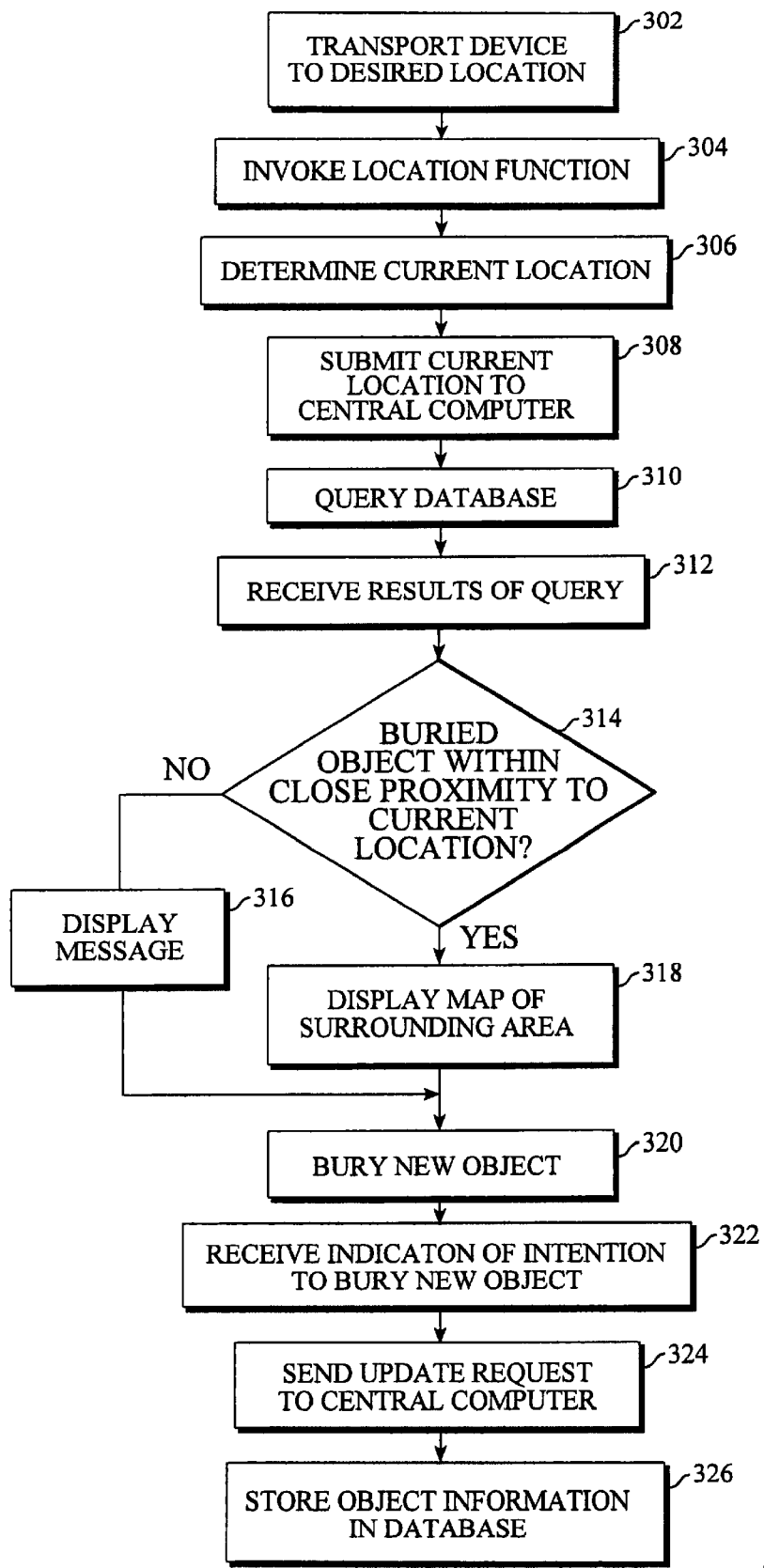
FIG. 3 is a flow diagram illustrating one embodiment of the methodology of the present invention.

In the manner described, the present invention enables buried objects to be located prior to any digging. By locating buried objects prior to digging, the present invention makes it possible to prevent inadvertent damage to the buried objects. The flow diagram of FIG. 3 illustrates the operation of a positioning device 102 which is capable of both locating previously buried objects and registering newly buried objects. For purposes of the invention, it is not required that the positioning device 102 be able to perform both functions. If so desired, the positioning device 102 may be adapted such that it performs the locating function without performing the registering function. Such a modification is within the scope of the invention.

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for locating buried objects, comprising:
   receiving by a positioning device a set of positioning signals from one or more positioning stations;
   determining by said positioning device a current location of said positioning device based upon said positioning signals;
   accessing a registry database wherein locations of buried objects are stored; and
   determining, based upon said current location of said positioning device and said registry database, whether one or more objects are buried within relatively close proximity to said current location.

2. The method of claim 1, further comprising:
   in response to a determination that no objects are buried within relatively close proximity to said current location, providing an indication to a user that the user may dig at said current location without disturbing previously buried objects.

3. The method of claim 2, further comprising:
   receiving input from a user indicating whether a new object is being buried at said current location; and
   in response to an indication that a new object is being buried at said current location, storing said current location into said registry database.

4. The method of claim 3, wherein storing comprises:
   storing geometry information pertaining to the new object.

5. The method of claim 1, further comprising:
   in response to a determination that one or more objects are buried within relatively close proximity to said current location, providing an indication to a user that digging at said current location may disturb previously buried objects.

6. The method of claim 1, further comprising:
   in response to a determination that one or more objects are buried within relatively close proximity to said current location, displaying a map of the area around said current location, said map indicating the location or locations of said one or more buried objects.

7. The method of claim 1, wherein determining comprises:
   querying said registry database for all buried objects having locations within a selected distance from said current location.

8. A positioning device, comprising:
   a positioning system having an input for receiving positioning signals from one or more positioning stations, and an output for providing a current location of said positioning device based upon said positioning signals;
   a user interface; and
   a buried object location mechanism, said location mechanism submitting said current location from said positioning system to a database management system and receiving therefrom information specifying zero or more locations corresponding to zero or more buried objects within a selected distance of said current location of said positioning device, said location mechanism providing an output to a user via said user interface in accordance with the information from said database management system.

9. The positioning device of claim 8, wherein said location mechanism receives from said database management system zero locations corresponding to zero buried objects, and responds by providing to the user via said user interface an indication that the user may dig at said current location without disturbing previously buried objects.

10. The positioning device of claim 8, wherein said location mechanism receives from said database management system one or more locations corresponding to one or more buried objects, and responds by providing to the user via said user interface an indication that digging at said current location my disturb previously buried objects.

11. The positioning device of claim 8, wherein said location mechanism receives from said database management system one or more locations corresponding to one or more buried objects, and responds by providing to the user via said user interface a map of the area around said current location, said map indicating the location or locations of said one or more buried objects.

12. The positioning device of claim 8, wherein said location mechanism receives from a user via said user interface an indication that a new object is being buried at said current location, and responds by submitting said current location to said database management system for storage.

13. The positioning device of claim 12, wherein said location mechanism further receives from the user via said user interface geometry information pertaining to the new object, and responds by submitting said geometry information to said database management system for storage.

14. The positioning device of claim 8, wherein said database management system is implemented as a part of said positioning device.

15. A system for locating buried objects, comprising:
   a positioning system having an input for receiving positioning signals from one or more positioning stations, and an output for providing a current location of said positioning system based upon said positioning signals;
   a user interface;
   a database management system for managing a registry database in which locations of buried objects are stored; and
   a buried object location mechanism, said location mechanism receiving said current position from said positioning system and submitting said current location to said database management system, said location mechanism receiving from said database management system information specifying zero or more locations corresponding to zero or more buried objects within a selected distance of said current location of said positioning device, said location mechanism providing an output to a user via said user interface in accordance with the information from said database management system.

16. The system of claim 15, wherein said location mechanism receives from said database management system one or more locations corresponding to one or more buried objects, and responds by providing to the user via said user interface a map of the area around said current location, said map indicating the location or locations of said one or more buried objects.

* * * * *